United States Patent [19]

Mycynek et al.

[11] Patent Number: 4,490,743

[45] Date of Patent: Dec. 25, 1984

[54] INTERCARRIER SIGNAL DETECTION CIRCUIT FOR A TELEVISION RECEIVER

[75] Inventors: Victor Mycynek, Des Plaines; Jouke N. Rypkema, Lombard, both of Ill.

[73] Assignee: Zenith Electronics Corporation, Glenview, Ill.

[21] Appl. No.: 378,569

[22] Filed: May 17, 1982

[51] Int. Cl.³ .................... H04N 5/44; H04N 5/62
[52] U.S. Cl. .................................. 358/197; 358/198
[58] Field of Search ............... 358/197, 198, 188, 23, 358/25; 455/130, 204, 206, 208

[56] References Cited

U.S. PATENT DOCUMENTS

| | | | |
|---|---|---|---|
| 3,538,245 | 11/1970 | Parker . | |
| 3,562,411 | 2/1971 | Poppa | 358/197 |
| 3,564,125 | 2/1971 | Avins | 358/197 |
| 4,062,044 | 12/1977 | Hanma et al. | 358/21 |
| 4,188,639 | 2/1980 | Murakami et al. | 358/25 |
| 4,199,786 | 4/1980 | Orii | 358/197 |
| 4,237,485 | 12/1980 | Saito et al. | 358/197 |
| 4,253,118 | 2/1981 | Flasza | 358/188 |
| 4,258,391 | 3/1981 | Papay | 358/197 |

FOREIGN PATENT DOCUMENTS

| | | | |
|---|---|---|---|
| 68977 | 4/1982 | Japan | 358/197 |
| 13981894 | 1/1975 | United Kingdom | 358/197 |

OTHER PUBLICATIONS

Intercarrier Buzz Phenomena Analysis and Cures, by Pieter Fockens, IEEE Transactions on Consumer Electronics, vol. C E-27, No. 3, Aug. 1981, pp. 381-395.
Milton E. Wilcox, A New TV Video/Sound Detector IC, IEEE Transactions on Broadcast and Television Receivers, 1974, vol. BTR-20.
Hans Kriedt, Maximilian Huber, Quasiparallel Sound IC's for Improved TV Tone Quality, Siemens AG, Components Group.

Primary Examiner—Tommy P. Chin

[57] ABSTRACT

An intercarrier signal detection circuit for a television receiver sound system comprises a SAW (Surface Acoustic Wave) filter coupled to the output of a tuner, the SAW filter having a response characteristic including two symmetrical lobes centered about 41.25 MHz and 45.75 MHz respectively. The signal developed at the output of the SAW filter is applied to an AGC-controlled IF amplifier and then separated into a 41.25 MHz sound IF component and a 45.75 MHz picture IF component. The 41.25 MHz sound IF component is applied to one input of a synchronous detector whose other input is injected with a carrier signal developed by a phase lock loop operated in response to the 45.75 MHz picture IF component. The synchronous cetector thereby produces a relatively clean 4.5 MHz intercarrier sound signal which is preferably enhanced by causing the injected carrier signal to exhibit a quadrature phase relationship with any 45.75 MHz picture IF remnants characterizing the separated 41.25 MHz sound IF component. The 45.75 MHz picture IF component and an amplitude limited representation thereof developed by the phase lock loop, are coupled to respective inputs of an additional detector for developing a baseband video signal which is used by an AGC circuit for controlling the gain of the IF amplifier.

13 Claims, 2 Drawing Figures

INTERCARRIER SIGNAL DETECTION CIRCUIT FOR A TELEVISION RECEIVER

BACKGROUND OF THE INVENTION

The present invention relates generally to television receiver sound systems and, more particularly, to a high-fidelity intercarrier signal detection circuit for developing a relatively clean 4.5 MHz intercarrier sound signal to facilitate the processing of a wideband television sound signal such as a stereophonic sound signal.

A number of proposals have been made over the years for the transmission of a stereophonic sound signal together with a conventional NTSC television picture broadcast. In order to make the transmission of a conventional television picture signal with a stereophonic sound component commercially attractive, it has been recognized that significant improvements in the sound reproducing qualities of conventional television receivers are required. In particular, the well known phenomenon of intercarrier buzz characterizing current television receiver sound systems becomes highly objectionable in the case of a stereophonic sound signal due to its increased bandwidth.

It is well known that an audible buzz, commonly referred to as intercarrier buzz, is produced by conventional television receiver sound systems. While not being especially objectionable in present monaural television receiver sound systems, the intercarrier buzz phenomenon imposes a severe limitation on proposed high-fidelity stereophonic sound systems for television receivers. Sources of intercarrier buzz in a television receiver generally result from various non-linearities characterizing the receiver's sound signal processing path, one such source being the tilt or Nyquist slope centered about the 45.75 MHz picture carrier of the receiver's intermediate frequency response characteristic. This tilt or slope, which is necessary to compensate for the vestigial sideband nature of the picture signal, imposes unequal gain on the modulation components of the picture signal on opposite sides of the 45.75 MHz picture carrier thereby phase modulating the carrier signal. When applied to a video detector, the phase modulated picture carrier will beat with the intermediate frequency sound signal to produce a 4.5 MHz intercarrier sound signal which, in addition to the desired audio frequency modulation, will also exhibit the undesired phase modulation of the picture carrier resulting in spurious buzz components. The effect of these spurious buzz components is more objectionable in a stereophonic sound system as compared to a monaural sound system since more of the spurious picture carrier sidebands are demodulated with a larger bandwidth stereophonic sound signal.

It is therefore a basic object of the present invention to provide an improved high-fidelity television receiver sound system.

It is a more specific object of the invention to provide an improved high-fidelity intercarrier signal detection circuit for a television receiver sound system which is adapted for producing a relatively clean 4.5 MHz intercarrier sound signal.

It is yet another object of the invention to provide an improved high-fidelity intercarrier signal detection circuit for a television receiver sound system which is adapted for reducing intercarrier buzz to facilitate the processing of a wideband television sound signal such as a stereophonic sound signal.

It is a still further object of the invention to provide an improved intercarrier signal detection circuit for a television receiver which is used to facilitate the production of an enhanced quality detected video signal.

BRIEF DESCRIPTION OF THE DRAWINGS

The features of the invention which are believed to be novel are set forth with particularity in the appended claims. The invention, together with its objects and the advantages thereof, may be best understood by reference to the following description taken in conjunction with the accompanying drawing in which:

DESCRIPTION OF THE PREFERRED EMBODIMENT

Figure 1:
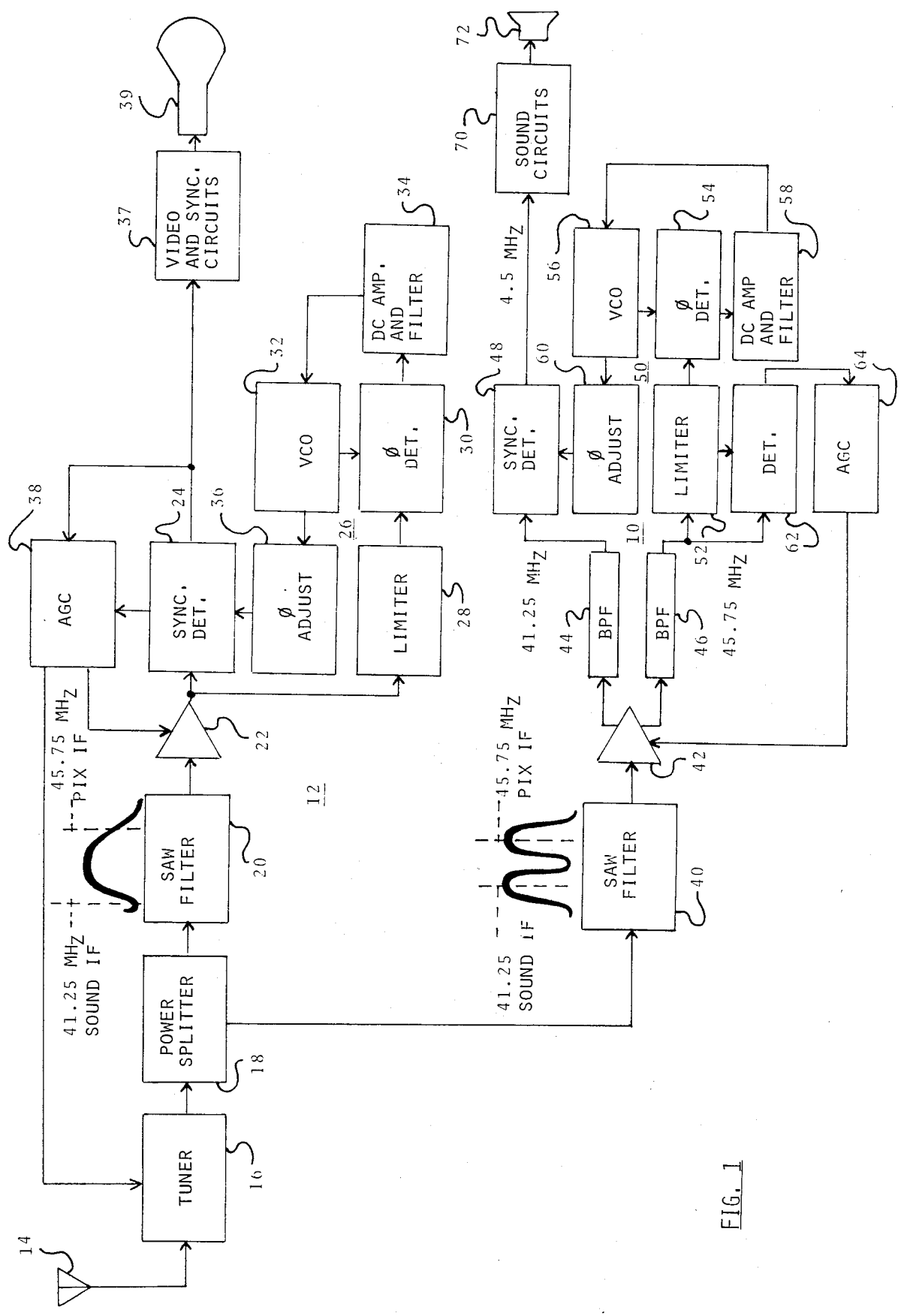
FIG. 1 is a block diagram of a television receiver illustrating an intercarrier signal detection circuit according to the present invention.

Referring to the FIG. 1, a television receiver constructed according to the present invention may be referred to as a quasi-split sound receiver in that the processing and detection of a received sound signal is facilitated by an intercarrier signal detector circuit 10 which is separate from the video circuit 12 used to process and detect a received picture signal. However, since intercarrier techniques are employed, a true split-sound receiver together with the disadvantages attendant thereupon, are avoided.

Referring more specifically to FIG. 1, a received RF television signal which may include a relatively wideband stereophonic sound component, is coupled from an antenna 14 to a tuner 16. Tuner 16, in a well known manner, converts the received RF television signal to an intermediate frequency (IF) signal having a frequency modulated 41.25 MHz sound component and an amplitude modulated 45.75 MHz picture component. The intermediate frequency signal developed at the output of tuner 16 is applied to a power splitter 18 which couples substantially equal portions of the IF signal to circuits 10 and 12 for further processing.

Video circuit 12 is conventional in design and includes a SAW (Surface Acoustic Wave) filter 20 connected for receiving the IF output signal from power splitter 18. SAW filter 20 typically has a pass-band characteristic as illustrated in FIG. 1 which includes a tilted or sloping response, commonly referred to as a Nyquist slope, centered about the 45.75 MHz IF picture carrier. This tilted response about the IF picture carrier, as is well known in the art, is necessary to compensate for the vestigial sideband nature of the broadcast picture signal. The pass-band characteristic of SAW filter 20 also has a relatively low response at the 41.25 MHz sound IF carrier to reduce the effects of cross-modulation whereby beat frequencies between the sound and chroma (42.17 MHz) IF carriers are transferred to the detected picture signal.

The output of SAW filter 20 is coupled to a gain-controllable intermediate frequency amplifier 22 and therefrom to the inputs of a synchronous detector 24 and a phase lock loop 26. Phase lock loop 26, which develops an oscillator signal that is coupled to a second input of synchronous detector 24, includes a limiter 28 for limiting the amplitude of the 45.75 MHz picture IF signal to a predetermined level. A phase detector 30 receives the 45.75 MHz output of limiter 28 and an oscillator signal developed by a VCO (voltage controlled oscillator) 32, and operates to develop at its output a signal representative of the frequency difference between the oscillator signal and the 45.75 MHz picture IF signal. The signal developed by the phase detector 30 is amplified and filtered by a DC amplifier and filter 34 and applied to VCO 32 to tune and phase lock it to the frequency of the 45.75 MHz picture IF carrier. In order to provide for proper synchronous detection of the video signal, the phase of the VCO signal coupled to synchronous detector 24 must be brought into alignment with the phase of the 45.75 MHz picture IF signal. Phase alignment or a zero degree phase difference between the injected VCO signal and the picture IF signal is facilitated by a phase adjustment circuit 36 which is appropriately set to insure a substantially zero degree phase difference between the injected VCO signal and the 45.75 MHz picture IF signal coupled to synchronous detector 24. The output of synchronous detector 24 thereby comprises a synchronously detected video signal including video synchronization components. The detected video signal and synchronization components are coupled to subsequent video and synchronization processing circuits 37 of the television receiver to produce an image on a CRT 39.

The detected video signal developed at the output of synchronous detector 24 is also coupled to the input of a conventional AGC circuit 38 which controls the gain of tuner 16 and IF amplifier 22 in a well known manner according to the signal strength of the received television signal.

As described previously, the intermediate frequency signal developed by tuner 16 is also supplied through an output of power splitter 18 to intercarrier signal detection circuit 10 through a SAW filter 40. SAW filter 40 has a response as illustrated in FIG. 1 which includes a first lobe symmetrically centered about the 41.25 MHz sound IF carrier and a second lobe symmetrically centered about the 45.75 MHz picture IF carrier. As explained previously, the Nyquist slope characterizing SAW filter 20, although necessary for faithfully processing the vestigial sideband picture signal, tends to phase modulate the IF picture carrier which results in the production of objectionable buzz components in the detected sound signal of a conventional television receiver. Moreover, these buzz components are enhanced and made more objectionable in the case of a stereophonic sound signal due to its increased bandwidth. These objectionable buzz components are minimized according to the present invention by processing the sound signal separately from the picture signal so that a symmetrical response about the 45.75 MHz picture IF carrier may be established in SAW filter 40 to prevent any undesired phase modulation of the picture IF carrier. Since sound stage 40 is used only for processing the sound signal, the vestigal sideband signal compensating Nyquist slope characterizing SAW filter 20 of video stage 12 need not be incorporated in SAW filter 40.

The output of SAW filter 40, comprising a single intermediate frequency signal including symmetrically processed sound and picture components, is coupled to a gain-controlled IF amplifier 42 which amplifies both the sound and picture components equally. The output of IF amplifier 42 is coupled to a pair of bandpass filters 44 and 46, the output of bandpass filter 46 comprising substantially only the 45.75 MHz picture IF component and the output of bandpass filter 44 comprising substantially only the 41.25 MHz sound IF component.

It will be observed that the response of filter 40 includes a relatively deep null between the two symmetrical lobes or peaks for reducing the output of filter 40 and thereby allowing for more linear processing in amplification stage 42. This improved linear amplification tends to reduce modulation distortion which might arise, for example, as a result of harmonics of the video modulation sidebands which appear near the 41.25 MHz sound carrier. The response null of filter 40 also serves to reduce single sideband video modulation components facilitating subsequent picture carrier regeneration.

The 41.25 MHz sound IF signal developed at the output of bandpass filter 44 is coupled to one input of a synchronous detector 48 whose other input is supplied with a oscillator signal developed by a phase lock loop 50. Phase lock loop 50 includes a limiter 52 for limiting the amplitude of the 45.75 MHz picture IF signal developed at the output of bandpass filter 46 to a predetermined level and for coupling the amplitude limited picture signal to one input of a phase detector 54. Phase detector 54 receives the output of limiter 50 and an oscillator signal from a VCO 56 and operates to develop at its output a signal representative of the frequency difference between the oscillator signal and the 45.75 MHz video signal. The signal developed by the phase detector 54 is amplified and filtered by a DC amplifier and filter 58 and applied to VCO 56 to tune and phase lock it to the frequency of the 45.75 MHz video signal received by phase detector 54. With this arrangement, a relatively clean 45.75 MHz oscillator signal is coupled to a phase adjustment circuit 60 for application to synchronous detector 48. The 45.75 MHz oscillator signal is processed with the 41.25 MHz sound IF signal by synchronous detector 48 for producing a relatively clean 4.5 MHz intercarrier sound signal which is coupled to the remaining sound circuits 70 of the television receiver for producing an audible sound signal by one or more speakers 72.

To further enhance the quality of the 4.5 MHz intercarrier sound signal produced at the output of synchronous detector 48 it is preferred to operate phase lock loop 50 such that the oscillator signal developed at the output of phase adjust circuit 60 is in phase quadrature relationship with any 45.75 MHz picture IF remnants characterizing the output of bandpass filter 44. In this manner, any low frequency video components not effectively filtered at the output of bandpass filter 44 will be cancelled in synchronous detector 48 for maintaining a high quality 4.5 MHz intercarrier signal.

The 45.75 MHz picture IF output of bandpass filter 46 is also coupled to the input of a detector 62, which may be either a synchronous or envelope type video detector, and is used to detect the video signal for operating an AGC circuit 64. In the case where detector 62 is a synchronous type detector, an output from limiter 52 may also be coupled to the detector as shown. AGC circuit 64 is connected for controlling the gain of IF amplifier 42 according to the strength of the received television signal.

What has thus been shown is an improved sound system for a television receiver which is adapted for producing an extremely clean 4.5 MHz intercarrier sound signal useful in high-fidelity applications such as stereo sound television.

Figure 2:
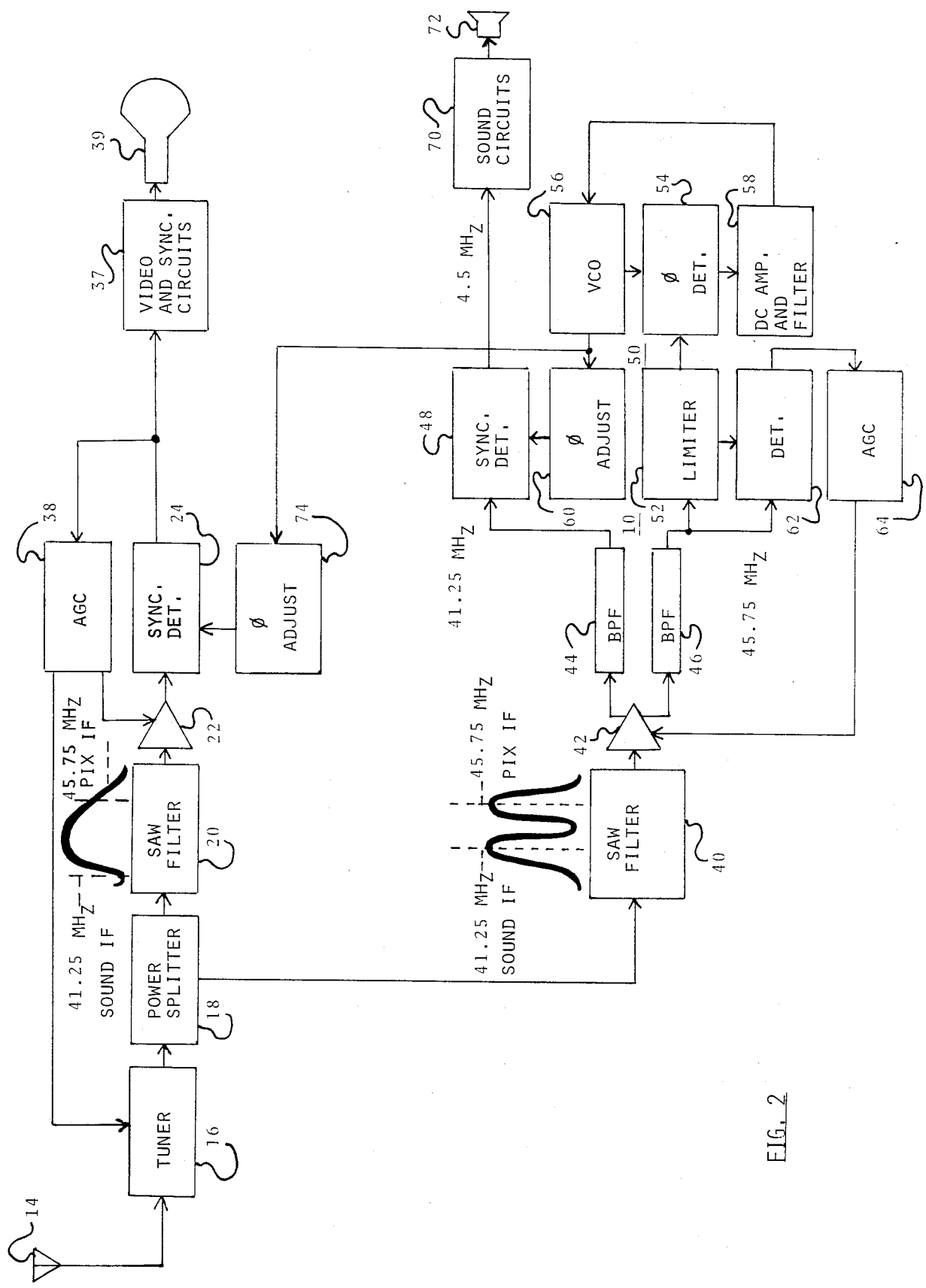
FIG. 2 is an alternate embodiment of the television receiver of FIG. 1.

FIG. 2 depicts an alternate embodiment of the invention in which the injected 45.75 MHz carrier supplied to synchronous detector 24 is derived from the oscillator signal developed at the output of VCO 56 of phase lock loop 50. In particular, the output of VCO 56 is coupled to a phase adjustment circuit 74 which is operated for adjusting the phase of the oscillator signal developed at the output of VCO 56 for supplying a 45.75 MHz carrier signal to synchronous detector 24 which is in substantial phase alignment with the phase of the 45.75 MHz picture IF signal developed at the output of IF amplifier 22.

In addition to reducing the cost of the television receiver by eliminating the use of phase lock loop 26, the FIG. 2 embodiment of the invention also provides improved performance in terms of the quality of the detected video signal developed at the output of synchronous detector 24. It will be recalled that due to the symmetrical response of SAW filter 40 about the 45.75 MHz IF picture carrier, a 45.75 MHz oscillator signal is developed by phase lock loop 50 which is characterized by a minimum amount of phase modulation. This oscillator signal, in addition to being used in association with synchronous detector 48 for producing a clean 4.5 MHz intercarrier sound signal, is also coupled by phase adjustment circuit 74 to synchronous detector 24 for enabling the production of a detected video signal exhibiting a reduced amount of quadrature distortion. Thus, by providing an oscillator signal characterized by a reduced amount of phase modulation, the quality of both the intercarrier sound signal as well as the detected video signal are significantly improved.

Further cost reductions in the circuits of FIGS. 1 and 2 may be effected by eliminating bandpass filters 44 and 46 and coupling the single IF signal developed at the output of amplifier 42 directly to the inputs of synchronous detector 48, limiter 52 and detector 62. This modification may not significantly degrade system performance if the bandwidth of phase lock loop 50 is sufficiently narrow.

Although the invention has been described in terms of a preferred embodiment, it will be obvious to those skilled in the art that many alterations and modifications thereto may be made without departing from the invention. Accordingly, it is intended that all such alterations and modifications be included within the spirit and scope of the invention as defined by the appended claims.

We claim:

1. In a television receiver having a tuner responsive to a received television signal for developing an IF signal including a sound IF component comprising a frequency modulated sound carrier and a picture IF component comprising an amplitude modulated picture carrier, an improved sound processing circuit comprising:

filter means receiving said IF signal for developing a single filtered IF output signal comprising a representation of said sound IF component symmetrically processed about said sound carrier and a representation of said picture IF component symmetrically processed about said picture carrier;
means for controllably amplifying said single filtered IF output signal;
automatic gain control means responsive to said amplified single filtered IF output signal for controlling the gain of said amplifying means;
signal generating means responsive to said amplified single filtered IF output signal for generating a substantially unmodulated reference signal having a frequency substantially equal to said picture carrier;
a synchronous detector; and
means for coupling said amplified single filtered IF output signal and said reference signal to respective inputs of said synchronous detector for developing an intercarrier sound signal.

2. A sound processing circuit according to claim 1 including means for separating said amplified single filtered IF output signal into first and second signals, said first signal comprising said symmetrically processed representation of said picture IF component and said second signal comprising said symmectrically processed representation of said sound IF component, said sound processing circuit further including second filter means coupling said first signal to said automatic gain control means and to said signal generating means and coupling said second signal to an input of said synchronous detector.

3. A sound processing circuit according to claim 2 wherein said second signal includes an attenuated form of said symmetrically processed representation of said picture IF component and wherein said signal generating means comprises means for causing said reference signal to assume a phase which is in quadrature with said attenuated form of said symmetrically processed representation of said picture IF component.

4. A sound processing circuit according to claim 3 wherein said signal generating means comprises a phase lock loop.

5. A sound processing circuit according to claim 4 wherein said phase lock loop includes a limiter receiving said first signal and wherein said automatic gain control means comprises a detector, means coupling said first signal and an output of said limiter to respective inputs of said detector for developing a demodulated output signal and means responsive to said demodulated output signal for controlling the gain of said amplifying means.

6. In a television receiver having a tuner responsive to a received television signal for developing an IF signal including a sound IF component comprising a frequency modulated sound carrier and a picture IF component comprising an amplitude modulated picture carrier, an improved sound processing circuit comprising:

filter means receiving said IF signal for developing a single filtered IF output signal comprising a representation of said sound IF component symmetrically processed about said sound carrier and a representation of said picture IF component symmetrically processed about said picture carrier;
means for controllably amplifying said single filtered IF output signal;
means for separating said amplified single filtered IF output signal into first and second signals, said first signal comprising said symmetrically processed representation of said picture IF component and said second signal comprising said symmetrically processed representation of said sound IF component, said second signal including an attenuated form of said symmetrically processed representation of said picture IF component;
automatic gain control means receiving said first signal for controlling the gain of said amplifying means;
a synchronous detector;

signal generating means receiving said first signal for generating a substantially unmodulated reference signal having a frequency substantially equal to said picture carrier and a phase substantially in quadrature relationship with the phase of said attenuated form of said picture IF component characterizing said second signal; and means for coupling said second signal and said reference signal to respective inputs of said synchronous detector for developing an intercarrier sound signal.

7. A sound processing circuit according to claim 6 wherein said signal generating means comprises a phase lock loop.

8. In a television receiver including means developing an IF signal including a symmetrically processed picture IF component and a sound IF component and an IF amplifier processing said IF signal for equally amplifying said picture and sound IF components, an improved sound processing circuit comprising:

signal generating means responsive to said amplified IF signal for generating a reference signal having a frequency substantially equal to the frequency of the carrier of said picture IF component;

automatic gain control means responsive to said amplified IF signal for developing a control signal for controlling the gain of said IF amplifier;

a synchronous detector; and means for coupling said reference signal and said amplified IF output signal to respective inputs of said synchronous detector for developing an intercarrier sound signal.

9. In a television receiver including means developing an IF signal including a symmetrically processed picture IF component and a sound IF component, an IF amplifier processing said IF signal for equally amplifying said picture and sound IF components and means for separating said amplified IF signal into first and second signals, said first signal comprising said amplified picture component and said second signal comprising said amplified sound component and an attenuated representation of said amplified picture component, an improved sound processing circuit comprising:

signal generating means receiving said first signal for generating a substantially unmodulated reference signal having a frequency substantially equal to the carrier of said picture IF component and a phase substantially in quadrature relationship with the phase of said attenuated representation of said amplified picture component;

automatic gain control means responsive to said first signal for developing a control signal for controlling the gain of said IF amplifier;

a synchronous detector; and means for coupling said reference signal and said second signal to respective inputs of said synchronous detector for developing an intercarrier sound signal.

10. A sound processing circuit according to claim 9 wherein said signal generating means comprises a phase lock loop including a limiter, said automatic gain control means including a detector responsive to said limiter and said first signal for developing said control signal.

11. A television receiver comprising:

tuning means for developing an IF signal having a sound IF component comprising a frequency modulated sound carrier and a picture IF component comprising an amplitude modulated picture carrier;

first IF means responsive to said IF signal for developing a vestigial sideband compensated IF signal;

detecting means having a first input connected for receiving said vestigial sideband compensated IF signal;

second IF means responsive to said IF signal and having a symmetrical response centered about said picture carrier and having a response centered about said sound carrier for developing a symmetrically processed IF signal;

means for controllably amplifying said symmetrically processed IF signal;

a synchronous detector;

means coupling the output of said amplifying means to a first input of said synchronous detector;

automatic gain control means responsive to said amplified symmetrically processed IF signal for controlling the gain of said amplifying means;

signal generating means receiving said amplified symmetrically processed IF signal for generating a first reference signal having a frequency substantially equal to the frequency of said picture carrier and a phase substantially in quadrature relationship with the phase of the picture component of said amplified symmetrically processed IF signal and a second reference signal having a frequency substantially equal to the frequency of said picture carrier and a phase in substantial alignment with the phase of said vestigial sideband compensated IF signal; and means coupling said first reference signal to a second input of said synchronous detector for developing an intercarrier sound signal and coupling said second reference signal to a second input of said detecting means for developing a composite baseband video signal.

12. A television receiver comprising:

tuning means for developing an IF signal having a sound IF component comprising a frequency modulated sound carrier and a picture IF component comprising an amplitude modulated picture carrier;

first IF means responsive to said If signal for developing a vestigial sideband compensated IF signal;

detecting means having a first input connected for receiving said vestigial sideband compensated IF signal;

second IF means receiving said IF signal for developing a single filtered IF output signal comprising a representation of said sound IF component symmetrically processed about said sound carrier and a representation of said picture IF component symmetrically processed about said picture carrier;

means for controllably amplifying said single filtered IF output signal;

means for separating said amplified single filtered IF output signal into first and second signals, said first signal comrising said symmetrically processed representation of said picture IF component and said second signal comprising said symmetrically processed representation of said sound IF component;

automatic gain control means receiving said first signal for controlling the gain of said amplifying means;

a synchronous detector;

signal generating means receiving said first signal for generating substantially unmodulated first and second reference signals each having a frequency substantially equal to said picture carrier; and means coupling said second signal and said first reference signal to respective inputs of said synchronous detector for developing an intercarrier sound signal and coupling said vestigial sideband compensated IF signal and said second reference signal respectively to said first and a second inputs of said detecting means for developing a composite baseband video signal.

13. A television receiver according to claim 12 wherein said second signal includes an attenuated form of said symmetrically processed representation of said picture IF component and wherein said signal generating means comprises means for causing said first reference signal to assume a phase which is in quadrature relationship with said attenuated form of said symmetrically processed representation of said picture IF component and for causing said second reference signal to assume a phase which is in alignment with the phase of said vestigial sideband compensated IF signal.

* * * * *